Figure 1:
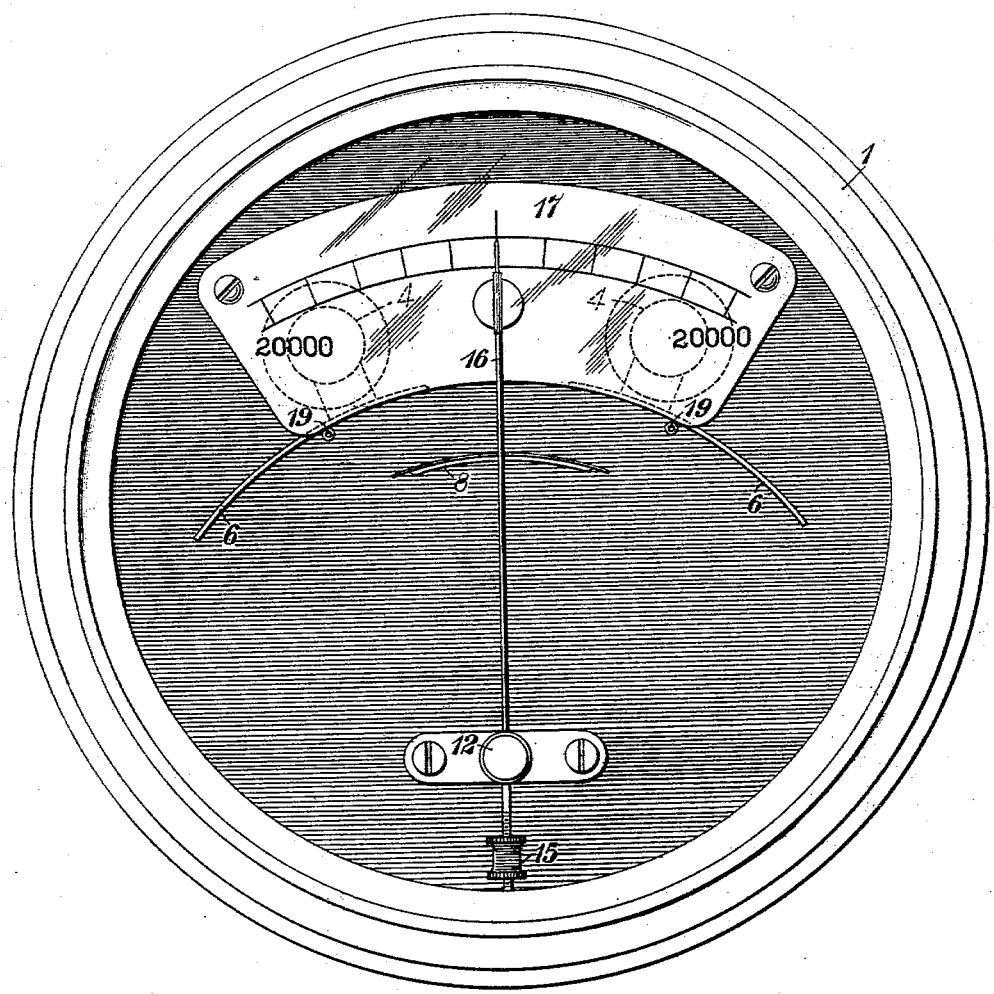

No. 716,868. Patented Dec. 30, 1902.
F. CONRAD.
GROUND DETECTOR FOR ELECTRIC CIRCUITS.
(Application filed July 12, 1901.)
(No Model.) 2 Sheets—Sheet 1.

WITNESSES:
C. L. Belcher
J. C. Morse

INVENTOR
Frank Conrad
BY Wesley G. Carr
ATTORNEY.

No. 716,868. Patented Dec. 30, 1902.
F. CONRAD.
GROUND DETECTOR FOR ELECTRIC CIRCUITS.
(Application filed July 12, 1901.)
(No Model.) 2 Sheets—Sheet 2.
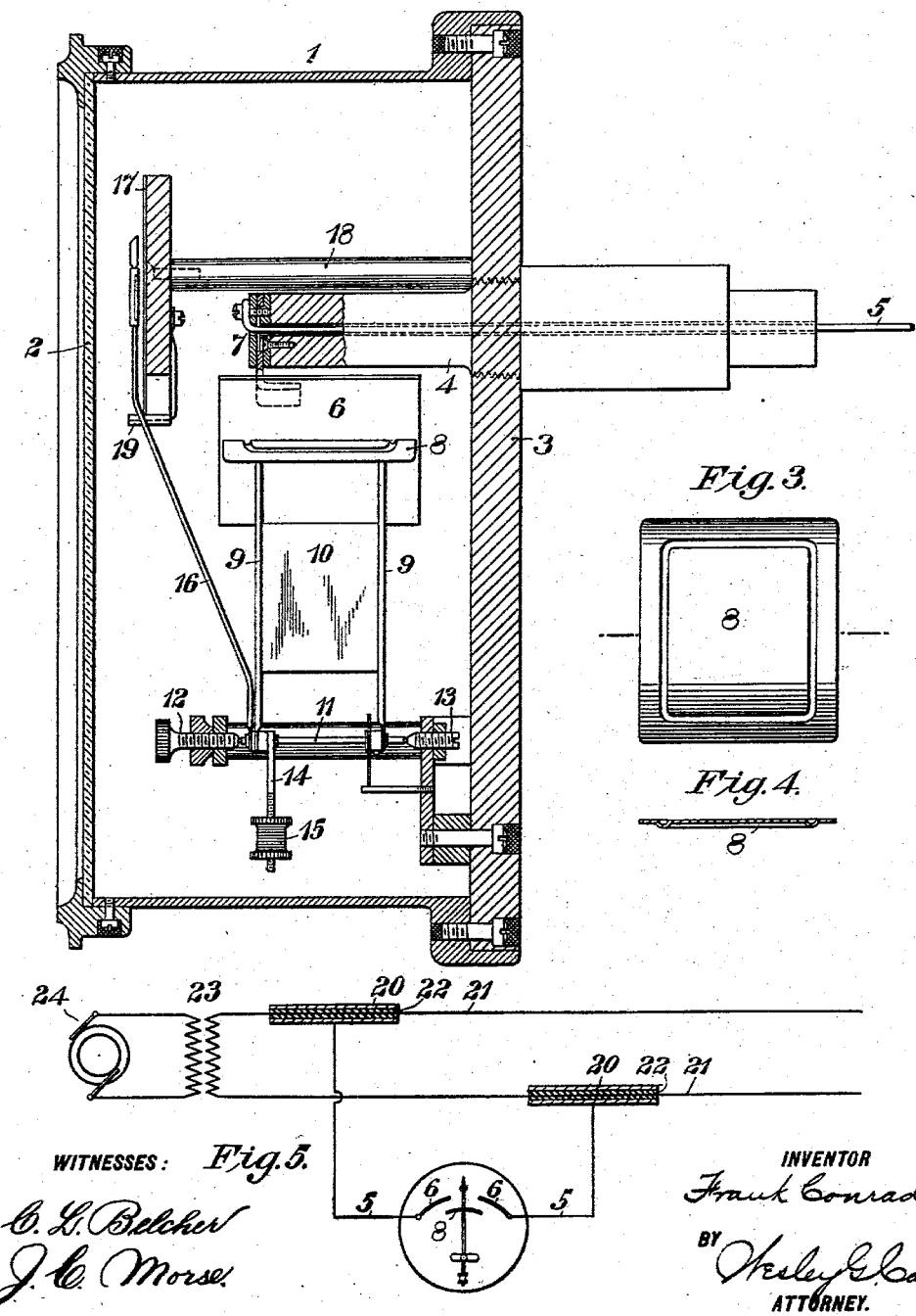
WITNESSES:
C. L. Belcher
J. C. Morse
INVENTOR
Frank Conrad
BY Wesley G. Carr
ATTORNEY.

UNITED STATES PATENT OFFICE.

FRANK CONRAD, OF WILKINSBURG, PENNSYLVANIA, ASSIGNOR TO WESTINGHOUSE ELECTRIC & MANUFACTURING COMPANY, A CORPORATION OF PENNSYLVANIA.

GROUND-DETECTOR FOR ELECTRIC CIRCUITS.

SPECIFICATION forming part of Letters Patent No. 716,868, dated December 30, 1902.

Application filed July 12, 1901. Serial No. 68,045. (No model.)

*To all whom it may concern:*

Be it known that I, FRANK CONRAD, a citizen of the United States, residing at Wilkinsburg, in the county of Allegheny and State of Pennsylvania, have invented a new and useful Improvement in Ground-Detectors for Electric Circuits, of which the following is a specification.

My invention relates to instruments employed in connection with electric circuits both wires of which are normally insulated from each other and from the ground for the purpose of detecting ground connections.

The object of my invention is to provide an instrument of the character indicated which shall be simple and inexpensive in construction and efficient in operation irrespective of the voltage of the current in connection with which it is used.

My invention is especially useful in connection with high-potential circuits, since such circuits are more likely to become grounded than those of low potential; but there is no necessary limitation in this respect, since the instrument may be designed and adjusted for use in connection with circuits of any voltage that is suitable for practical service.

Instruments have heretofore been devised which operated statically to indicate ground connections; but in all cases, so far I am aware, such instruments where employed in connection with high-potential circuits have had impedance bodies in the form of ohmic resistances introduced into the conductors leading from the instrument to the line-circuit in connection with which it was used in order to reduce the voltage impressed upon the instrument. Instead of employing such impedance bodies I propose to interpose condensers between the instrument and the circuit in connection with which it is used.

My invention is illustrated in the accompanying drawings, in which—

Figure 1 is a front elevation of the instrument. Fig. 2 is a vertical sectional view of the instrument. Figs. 3 and 4 are respectively a plan and a sectional view of the movable vane, and Fig. 5 is a diagram of the instrument and its circuit connections.

The main operating parts of the instrument are shown as inclosed within a case 1, the face 2 of which may be of glass and the other parts of any suitable material. The base-plate 3 is provided with two hollow posts 4, through which the conductors 5 from the circuit in connection with which the instrument is used project. The inner end of each post is provided with an arc-shaped metal vane 6, which is connected to the corresponding conductor 5 by means of suitable binding devices 7, mounted on the corresponding post 4. An arc-shaped metal vane 8 is mounted upon the outer ends of two conducting-arms 9, between which is located a sheet of light thin material 10—such, for example, as mica. The other ends of the arms 9 are fastened to a shaft 11, that has bearings at its ends in the ends of two adjusting-screws 12 and 13. Attached to the shaft 11 and projecting in the opposite direction to the arms 9 is a rod 14, on which is adjustably mounted a weight 15 in order to secure the proper balance of parts.

Fastened rigidly to the shaft 11 is one end of a needle or pointer 16, the free end of which moves over a scale on a dial-plate 17, which is supported upon posts 18 and is provided with stops 19 to limit the movement of the needle. The needle is rendered approximately dead-beat by reason of the sheet 10, which serves as a damping device. The movable vane 8 is connected to the ground through the arms 9, shaft 11, its bearing-screw 13, and any suitable conducting means leading from the latter, and each of the conductors 5 is connected to one plate of a condenser—such, for example, as a tube 20—which surrounds the corresponding main-circuit conductor 21 and is separated therefrom by means of suitable insulating material 22. In this case the conductor 21 obviously constitutes the other conducting element of the condenser. Any other suitable form of condenser might obviously be employed, if desired.

I have shown the circuit 21 as supplied from the secondary of a transformer 23, the primary of which receives energy from an alternating-current generator 24. This particular means for supplying energy to the circuit in connection with which the instrument is used is not, however, essential to the invention.

The scale on the dial-plate 17 is so graduated that the pointer or needle 16, which is attached to and moves with the movable vane 8, will indicate directly in volts the difference in potential between the ground and each of the two conductors 21.

When both conductors 21 are fully insulated, the potential between each of them and the ground is equal to that between the other and the ground, and the pointer will be at the middle point of the scale. If, however, one of the conductors becomes grounded, the potential between this conductor and the ground will be less than that between the other conductor and the ground, and the movable vane, and consequently the pointer, will be deflected toward the side having the greater difference of potential, the difference in potential being indicated in volts on the scale.

It has been found that where ohmic resistance has been employed for the purpose of preventing short circuits between the movable and fixed vanes of instruments of this general character such resistance to be satisfactorily operative must be extremely high. It has been the practice, however, to use a much lower resistance than would be safe for all conditions of operation, and consequently such proportion of voltage has been taken by the instruments that lightning discharges were likely to seriously damage the instrument even though the resistance were sufficient to prevent formation of short circuits under ordinary conditions. By employing condensers instead of ohmic resistances in this connection I am able to avoid all danger in the direction above indicated, and since the voltage of the condenser and that of the instrument will be in phase the total voltage of the circuit will be equal to the sum of the voltage over the condenser and the instrument, and since the admittance of the condenser will vary in the same degree as that of the instrument, with changes in frequency, a condenser that is correct for one frequency will be correct for all frequencies.

By employing metal tubes in connection with the circuit-conductors, as indicated, the combination is, in effect, two concentric cylinders separated by sufficient air-space or solid insulation, or both, to provide the conditions desired, the size of the tubes and the amount of insulation to be employed being capable of ready calculation by those skilled in the art.

Instead of combining the tubes directly with the main-line conductors they may of course be combined with the conductors 5, leading to the instrument, if desired, and, as has been already stated, a different form of condenser may be utilized if it is found to be more convenient or desirable in any particular case.

I claim as my invention—

1. A ground-detector for electric circuits comprising a movable vane connected to the ground, a plurality of stationary vanes located in inductive relation to the movable vane and condensers the conducting elements of which are respectively short portions of the circuit-wires and corresponding lengths of metal supported thereby, the latter being connected to the stationary vanes.

2. A ground-detector for electric circuits comprising a movable vane connected to the ground, a plurality of stationary vanes located in inductive relation to the movable vane, condensers the conducting members of which are respectively short portions of the circuit-wires and tubes of corresponding length surrounding the same, the latter being connected to the stationary vanes, and means for indicating the deflection of the movable vanes.

3. A ground-detector for electric circuits comprising a movable vane connected to the ground, a plurality of stationary vanes located in inductive relation to the movable vane, condensers the conducting members of which are respectively short portions of the circuit-wires and tubes of corresponding length surrounding the same, the latter being connected to the stationary vanes, a stationary scale and a pointer connected to the movable vane and movable over said scale to indicate the deflection of said vane.

4. A ground-detector for electric circuits comprising a movable vane connected to the ground, a plurality of stationary vanes located in inductive relation to the movable vane, condensers the conducting members of which are respectively short portions of the circuit-wires and tubes of corresponding length surrounding the same, the latter being connected to the stationary vanes, a stationary scale, a pointer connected to the movable vane and means for moving the said pointer and vane to zero position when not acted upon by the stationary vanes.

5. A ground-detector for electric circuits comprising a movable vane connected to the ground, a plurality of stationary vanes located in inductive relation to the movable vane, condensers the conducting members of which are respectively short portions of the circuit-wires and tubes of corresponding length surrounding the same, the latter being connected to the stationary vanes, a stationary scale, a pointer connected to the movable vane and adjustable means for bringing the pointer to zero position when the movable vane is not acted upon by the stationary vanes.

6. A ground-detector for electric circuits comprising a movable vane connected to the ground, a plurality of stationary vanes located in inductive relation to the movable vane, short metal tubes surrounding and insulated from the conductors in connection with which the instrument is used, and means for electrically connecting the stationary vanes to said tubes.

7. A ground-detector for electric circuits comprising a movable vane connected to the ground, a plurality of stationary vanes located in inductive relation to the movable vane, condensers the conducting members of which are respectively short portions of the circuit-wires and tubes of corresponding length surrounding the same, the latter being connected to the stationary vanes, and a damping device for the movable vane.

8. A ground-detector for electric circuits comprising a plurality of stationary vanes, condensers interposed between the same and line conductors, a movable vane located in inductive relation to the stationary vanes, arms upon which said movable vane is mounted and a damping device supported by said arms.

9. A ground-detector for electric circuits comprising a plurality of stationary vanes, condensers interposed between the same and the line conductors, a movable vane located in inductive relation to the stationary vanes, a pair of parallel arms upon which said movable vane is mounted and a damping device mounted between and supported by said arms.

In testimony whereof I have hereunto subscribed my name this 10th day of July, 1901.

FRANK CONRAD.

Witnesses:
JAMES B. YOUNG,
WESLEY G. CARR.